United States Patent [19]
Ramos

[11] Patent Number: 5,649,730
[45] Date of Patent: Jul. 22, 1997

[54] DUMP TRUCK ADVERTISING SYSTEM

[76] Inventor: Raul A. Ramos, 3013 Conti St., New Orleans, La. 70119

[21] Appl. No.: 375,976

[22] Filed: Jan. 20, 1995

[51] Int. Cl.$^6$ ........................................... B60R 13/00
[52] U.S. Cl. ........................ 296/21; 40/611; 40/591
[58] Field of Search ............... 296/21, 184; 40/611, 40/590, 591

[56] References Cited

U.S. PATENT DOCUMENTS

| | | | |
|---|---|---|---|
| 3,740,882 | 6/1973 | Lanphere et al. | 40/591 |
| 3,958,350 | 5/1976 | Garson | 40/591 |
| 4,049,479 | 9/1977 | Siker | 40/590 X |
| 4,616,879 | 10/1986 | Booher | 296/184 X |
| 5,415,451 | 5/1995 | Stanton | 296/21 |

*Primary Examiner*—Joseph D. Pape
*Attorney, Agent, or Firm*—C. Emmett Pugh; Pugh/ Associates

[57] ABSTRACT

A vehicle mounted advertising system attachable to a vehicle having non-planar sidewalls that pivot with respect to the vehicle's chassis such as a dump truck. The advertising system comprises a rigid frame member, a first surface member for displaying advertising indicia, a sign surface member, and a border member. The rigid frame member defines an interior area closed over by the frame member and includes a mechanical connection for attaching the frame member against the non-planar, vehicle sidewall. The first surface member is attached to the frame member in a manner such that the interior area is substantially covered and bridged over by the first surface member. The border member is in mechanical connection with the frame member in a manner such that the perimeter of the sign surface member is covered by the border member. Attention-getting, dynamic elements, including a motor driven, moving display member and a cigarette simulation using the truck's exhaust for "cigarette smoke" (or other smoking effect), are also disclosed, with the motor preferably located in one of the cavities created between the sign frame member and the open area in the dump truck's side wall existing between the longitudinally spaced, vertically extending, sidewall structural strengthening members. Additionally, the sign, which preferably extends substantially above and below the truck sidewall, is moveable up and down with respect to the dump truck bed to achieve a desirable clearance when needed.

26 Claims, 3 Drawing Sheets

DUMP TRUCK ADVERTISING SYSTEM

TECHNICAL FIELD

The present invention relates to a vehicle mounted advertising system and more particularly to a vehicular, preferably planar, side-mounted advertising system mounted upon a vehicle having non-planar sidewalls, such as for example, a dump truck and the like. Even more particularly the present invention is directed to such a vehicular sign system which includes one or more dynamic effects to add to the signs' attention getting capabilities.

BACKGROUND ART

It is a common sight to see signs and other advertising displayed on the side of vehicles traveling the roads. These signs are generally directly applied to the planar side walls of the vehicle and are displayed wherever the vehicle travels. An example of such an application would be the sidewalls of a tractor trailer truck or an eighteen wheeler. The large, smooth, sidewall surface and the generally moderate road conditions endured by such vehicles make them ideal vehicles upon which advertisements may be displayed. However, because eighteen wheelers often travel throughout the country, advertising on these vehicles typically is limited to national companies who conduct business throughout the country or to the products carried by the trucks, i.e., "CocaCola™", "Budweiser™" etc.

Another type of vehicle having large sidewalls upon which advertisements could be displayed is the dump truck. These vehicles generally operate in a limited geographic region, making them suitable for use by local advertisers. However, these vehicles are rarely, if ever, used for any large-size, side display advertising purposes, because it was expected that the often brutal conditions under which these vehicles are required to operate would quickly damage and/or destroy any such signs. Also, the types of loads typically being carried by dump trucks, namely, dirt, aggregates, etc., are not products that would generally be advertised. Additionally and more importantly, because dump trucks have channelized, non-planar sidewalls created by laterally spaced, vertically extending, structural strengthening members, applying a relatively large planar sign of substantial size was considered impractical due to the lack of any large planar surface upon which to apply a side wall sign.

It would be a benefit, therefore, to have an advertising system for displaying a relatively large sign or other advertising display on the side of a dump truck, but such at least generally has been unachieved until the present invention, despite a long-felt need for the system of the invention and the long term availability of the means to make the invention. The present invention fulfills and satisfies this long-felt need in a very practical and cost-effective manner.

GENERAL SUMMARY DISCUSSION OF INVENTION

It is thus an object of the invention to provide a system for attaching a relatively large advertising display against at least one and preferably both of the sidewalls of the dump truck body that allows relatively large, conventional, generally flat or planar sign indicia to be displayed, particularly for local advertising campaigns.

It is a further object of the invention to provide a system for attaching an advertising display against the sidewalls of a dump truck that includes one or more visual, dynamic devices or simulators to further attract the attention of potential viewers.

It is a still further object of the invention to provide a method of attaching and displaying a preferably planar, relatively large advertising display against and on the non-planar sidewalls of a dump truck that allows the advertising display to be effectively displayed and thereafter easily and rapidly changed.

It is a still further object of the invention to provide a system for attaching an advertising display to the side of a dump truck that is lightweight and may be vertically moved up and down with respect to the truck bed to adjust the effective height (top and bottom) of the sign with respect to the truck bed and the ground when necessary.

Another object of the invention is to provide a sign display for a non-planar, truck sidewall which extends substantially above and below the sidewall and is vertically moveable with respect to the truck chassis to change its effective clearance with the ground and the upper edge of the sidewall.

Still another object of the invention is to use the sign structure to create effectively enclosed areas between the vertically extending structural strengthening members in the sidewall into which enclosed area one or more motors and other parts of the sign not to be viewed can be located.

Accordingly, the present invention in its preferred embodiment provides a vehicle-mounted, relatively planar and relatively large advertising system attachable to a vehicle having non-planar sidewalls such as, for example, a dump truck. The advertising system preferably includes a sign base framework comprising—a rigid frame member, a first surface member, a sign surface member, and a border member, although substantial variations to this structural approach are possible within the scope of the invention.

The rigid frame member defines an interior area enclosed by the frame member and includes means for attaching the frame member against the non-planar sidewall of the vehicle, typically a dump truck. The frame member is preferably rectangularly shaped and preferably constructed from, for example, steel tubing having a cross-section defined by four sides, and more preferably constructed from, for example, three-quarter-inch steel tubing. In addition, the frame member may include a plurality of cross-members preferably oriented in parallel relationship to one another for added strength.

A preferred means for attaching the frame member against and to the non-planar sidewall of a dump truck includes a length of angled steel stock mechanically connected along one side to the frame member and having a plurality of apertures of a size sufficient for a bolt to pass through along the other side. The term "mechanical connection" is used herein throughout to mean either direct mechanical connection between the items or a connection formed through an intermediate part.

The first surface member is attached to the frame member in a manner such that the interior area is substantially covered by the first surface member. The first surface member provides a surface upon which to attach the advertising or informational indicia. The first surface member is preferably constructed of metal sheeting, and more preferably of galvanized metal sheeting having a gauge thickness between, for example, twenty and forty gauge units. It is preferred to attach the first surface member to the frame member by welding.

The sign surface member is attachable to the first surface member in a manner such that the sign surface member substantially covers the first surface member. The sign surface member has a perimeter. The sign surface member is preferably constructed of a plastic material, and more preferably constructed from "coroplast" sheeting. The sign surface member is preferably attached to the first surface member with, for example, an adhesive.

The border member is in mechanical connection with the frame member in a manner such that the perimeter of the sign surface member is covered by the border member. The border member is preferably constructed from flat aluminum bar stock. The border member is preferably bolted to the border member with a series of spaced bolts.

In a preferred embodiment, the advertising system also includes—a motor, in mechanical connection with the frame member, having a rotatable shaft; the first surface member has a first aperture through a portion thereof; and the sign surface member has a second aperture through a portion thereof in substantial alignment the first aperture. In this embodiment the rotatable shaft of the motor is disposed through the first and second apertures. A dynamic, attention grabbing device such as a rotatable, motor driven or wind driven wheel is preferably attached at the end of the shaft.

In another preferred embodiment, the advertising system first described includes an elongated, flexible piping member having a first and second end. The first end is adapted for connection with the engine exhaust system of a vehicle, while the exit end ultimately leads to a smoke emitting, dynamic device.

In this embodiment the first surface member has a first aperture through a portion thereof; and the sign surface member has a second aperture through a portion thereof in substantial alignment with the first aperture. The first and second apertures have disposed therethrough the second end of the elongated, flexible piping member integrated into and forming a part of the display sign. When the vehicle is operating, exhaust smoke exits the second end of the flexible piping member, attracting additional attention to the sign.

In another aspect of the invention, a method of attaching a sign to the bed of a dump truck is provided. The preferred, detailed method comprises: a) providing a rigid frame member defining an interior area enclosed by the frame member, the frame member having means for attaching the frame member against non-planar sidewall of the vehicle; b) providing a first surface member attachable to the frame member in a manner such that the interior area is substantially covered by the first surface member; c) providing a sign surface member attachable to the first surface member in a manner such that the sign surface member substantially covers the first surface member, the sign surface member having a perimeter; d) providing a border member; e) attaching the frame member against the non-planar sidewall of the vehicle; f) attaching the first surface member to the frame member in a manner such that the interior area is substantially covered by the first surface member; g) attaching the sign surface member to the first surface member; and h) attaching the border member in mechanical connection with the frame member in a manner such that the perimeter of the sign surface member is covered by the border member.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers, and wherein.

EXEMPLARY MODE FOR CARRYING OUT THE INVENTION

Figure 1:
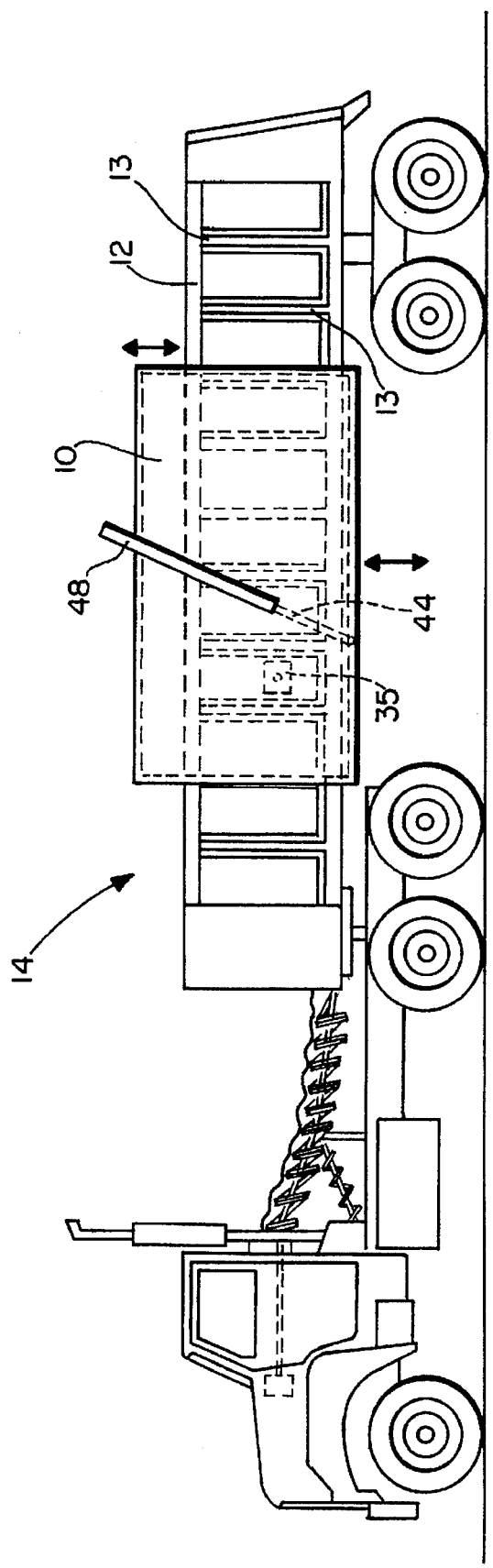
FIG. 1 is a side view showing an exemplary embodiment of the advertising system of the present invention installed on a representative dump truck, with a vertical directional arrows indicating the vertical moveability of the sign system with respect to the sign's ground clearance and the top of the dump truck sidewall body.

FIG. 1 shows a preferred embodiment of the advertising system 10 of the present invention installed against the near sidewall 12 of a representative dump truck 14, which typically has a rear truck body with opposed sidewalls 12 which is pivotable with respect to the truck's chassis for dumping purposes. Each sidewall includes a series of spaced, vertically disposed, struts or strengthening members 13 having open spaces between them, resulting in an irregular, non-planar surface.

For general background information, it is noted that the "Palmer™" type of aggregate dump truck illustrated in FIG. 1 typically has a dump body about twenty to about twenty-four (20–24') feet in length, and a sidewall height of about four (4') feet, with the strengthening members or braces 13 being spaced apart from one another about a foot and a half (1.5') and extending out from the spaced planar surfaces of the sidewall about six (6") inches. A "Mate" type dump truck (not illustrated) typically might have a sidewall height of about five feet, eight inches (5'8") and a dump body length of about thirty to about thirty-two (30–32') feet. Of course, other styles and types of dump trucks would have other exemplary dimensions.

Figure 2:
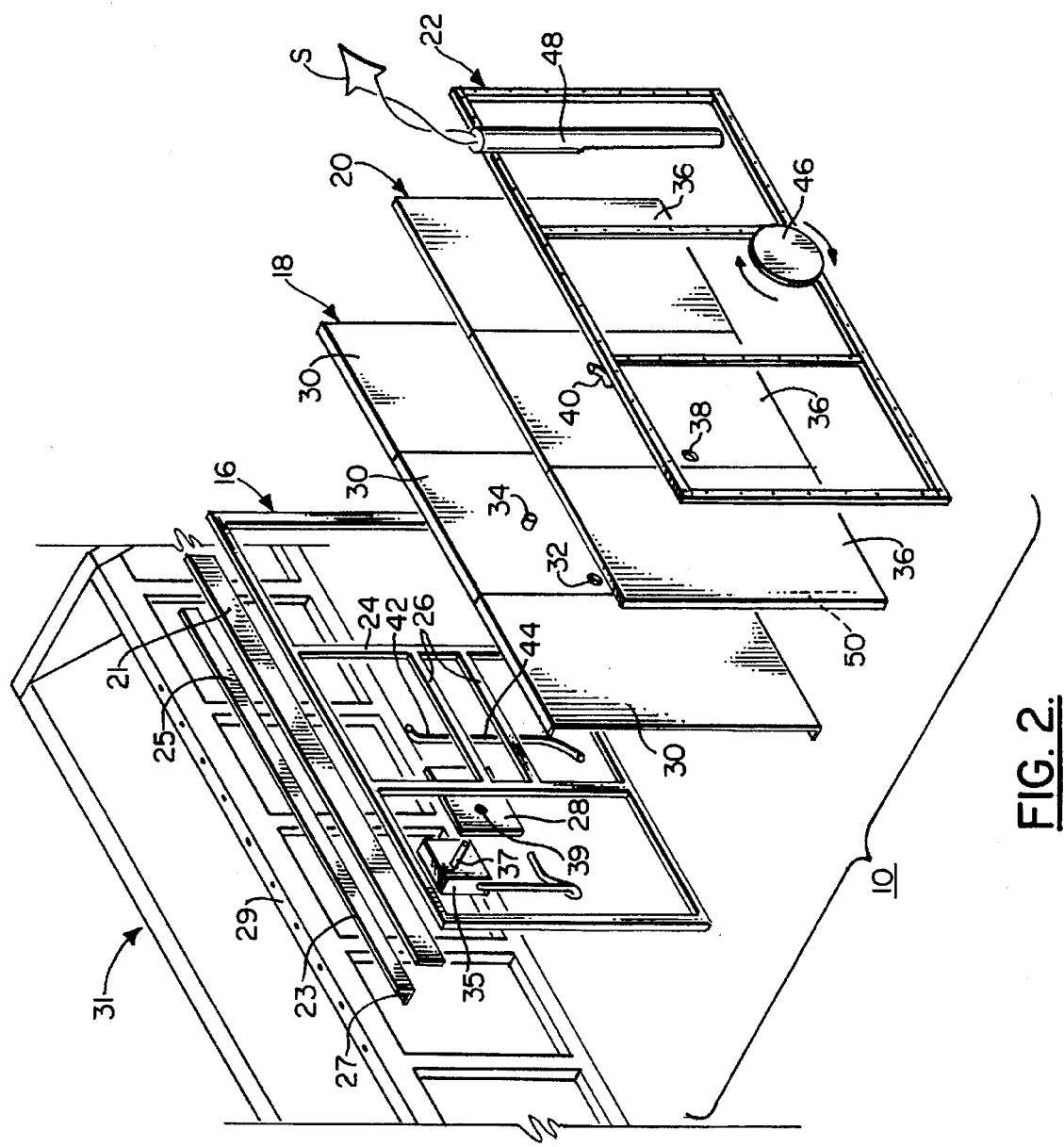
FIG. 2 is an exploded, perspective view showing particularly the structural elements of the sign portion of the embodiment shown in FIG. 1.

FIG. 2 is an exploded view of the advertising system 10 of FIG. 1. As can be seen, it extends over and across seven (7) of the sidewall strengthening members 13, with at least three (3) being minimally preferred. Additionally, in order to maximize the sign's effectiveness, the system 10 extends both above and below the sidewall, preferably on a moveable mount, as explained more fully below.

As seen in these figures, the system 10 basically includes a frame member 16, a first surface member 18, a sign surface member 20 upon which advertising or promotional indicia is displayed (note FIG. 4), and a border member 22.

The frame member 16 is constructed out of, for example, four lengths of three-quarter inch by half inch (¾" by ½") rectangular cross-section steel tubing. The four lengths are welded together at their ends to form a substantially rectangular frame member. For added support, frame member 16 includes two cross members 24 oriented in parallel to each other that have been welded into place.

Two, motor mount bars 26 are welded between the cross-members to provide support for a motor plate 28. An electric motor 35 having a shaft 37 is installed onto motor plate 28 with the shaft 37 extending through a shaft aperture 39 of the motor plate 28. The shaft 37 is about, for example, six (6") inches long.

The frame member 16 also includes a wind deflector 21 and a length of angle iron 23. The wind deflector 21 is welded to the top rear portion of the frame member 16. One side 25 of the angle iron 23 is welded to the wind deflector 21. The other side 27 includes a series of bolt apertures (not shown) that are used to bolt the angle iron 23 to the top 29 of the dump bed 31, which has been modified to include a series of bolt holes 33.

The first surface member 18 is constructed from three sheets 30 of, for example, twenty-eight (28) gauge, galvanized steel, sheeting. The three sheets 30 are welded to the frame member 16. As shown in the figure, the first member 18 includes a first aperture 32 and a second aperture 34.

The sign surface member 20 in this embodiment is constructed of three sections 36 of, for example, "Chloroplast™" plastic sheeting. The sign surface member 20 includes a third aperture 38 and a fourth aperture 40. The sign surface member 20 is attached to the first surface member 18 with, for example, adhesive caulking. The third and fourth apertures 38 & 40 are positioned on the sign surface member 20 so as to line up with the first and second apertures 32 & 34 of the first surface member 18, respectively.

The shaft 37 is then installed through the passageway formed by the first and third apertures 32 & 38. The end of the shaft 37 extending out through the aperture 38 is connected with a rotating (or otherwise dynamic), attention getting or attracting device 46. A first, upper end 42 of a flexible piping member 44 is installed through the passageway formed by the second and the fourth apertures 34 & 40 and connected to a smoke venting, attention getting or attracting device 48, which provides a dynamic action in its smoke venting capabilities. In this exemplary embodiment, the smoke venting attracting device 48 is a length of pipe decorated to look like a cigarette, with the vehicle's exhaust smoke emanating from its upper end simulating a smoking cigarette.

The border member 22 is constructed from, for example, four lengths of flat, one-inch (1") wide, aluminum bar stock. The bars are bolted to the frame member 16 at, for example, approximately every six (6") inches around its perimeter, in a manner such that the sign surface member perimeter 50 is located between the border member 22 and the frame member 16.

Figure 3:
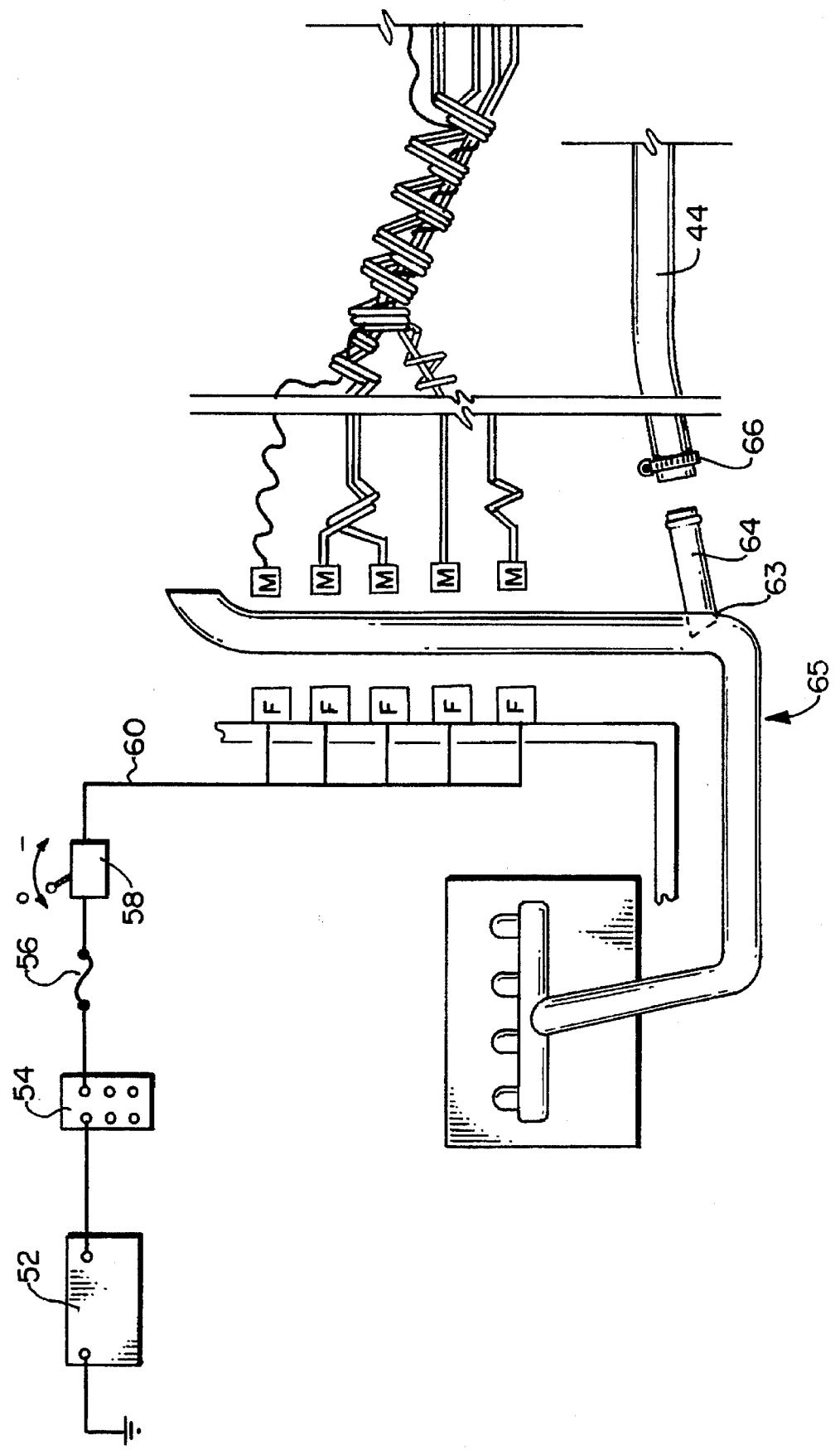
FIG. 3 is a schematic diagram showing a preferred mode of connecting the dump truck motor and piping member to the smoke emitting device which is a dynamic part of the sign system.

FIG. 3 is a schematic diagram illustrating the connections between the dump truck 14 and the electric motor 35 and piping member 44. The electric motor 35 (note FIGS. 1 and 2) is connected to the battery 52 of the dump truck 14 through a junction box 54, a fuse 56, a series switch 58, and a cable 60. The cable 60 is wired to the electric motor 35. The series switch 58 preferably is installed within the cab of the dump truck 14 to allow the driver to turn the motor 35 "on" and "off" from within the cab. As can be seen in FIG. 1, a particularly efficacious location for placing the motor 35 is in the open, "indented" area formed between the backside of the sign and two, adjacent or opposed, structure strengthening members or braces 13 in the sidewall.

The flexible piping member 44 is connected to the vehicle engine exhaust system via an exhaust tap 64, which is welded into a small hole 63 cut into the exhaust system piping 65. The flexible piping member 44 is attached to an end of the exhaust tap 64 with, for example, a hose clamp 66. A suitable control sub-system 90 is included for opening and closing the piping extending from the exhaust tap 64 ultimately to the elongated, "cigarette"-like structure 48 mounted on the sign surface 20, with the on/off switch located in the truck cab, allowing the driver to turn the "smoking" system on and off.

Figure 4:
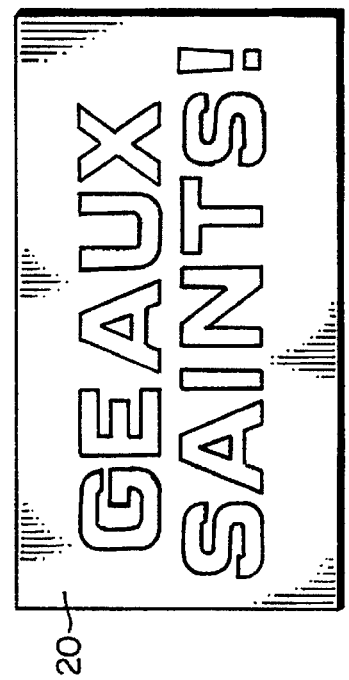
FIG. 4 is a plan view of exemplary advertising indicia placed on the sign display surface for advertising or promotional purposes.

The advertising system 10 is used by applying an advertising message, text and/or logo, symbol or design, or other advertising or informational indicia (see, e.g., exemplary advertising or promotional indicia being illustrated in FIG. 4) to the sign surface 20 and driving and/or using the dump truck in a normal fashion, while also using it to display the advertising or informational indicia. As noted above, an exemplary embodiment of such advertising, information indicia [namely, "GEAUX (Go) SAINTS!"] is illustrated in FIG. 4, which embodiment is, of course, purely exemplary and subject to great variation in form and content.

When it is desired to change the advertising message, the border member 22 is removed and the sign surface member 20 is detached from the first surface member 18 with, for example, a scraping device. A new sign surface member 20 is then attached to the first surface member 18, and the border member 22 is reattached. In a test, prototype device, it was found, in connection with the exemplary embodiment, that this procedure requires approximately one and a half hours to about two (~1.5–2 hrs.) hours to perform.

The inventive method of advertising by attaching an advertising sign with advertising indicia thereon to and against the non-planar sidewalls of a dump truck is described below with reference to FIGS. 1–3. The method includes the following, preferred steps:

a) providing a rigid frame member 16 as previously described;

b) providing a first surface member 18 as previously described;

c) providing a sign surface member with advertising indicia thereon as previously described;

d) providing, if so desired and needed, a border member 22 as previously described;

e) attaching the frame member against the non-planar sidewall of the vehicle by, for example, bolting the side 27 of the angle iron 23 to the top 29 of the dump bed 31, which has been modified to include a series of bolt holes 33;

f) welding the first surface member 18 to the frame member 16 in a manner such that the interior area is substantially covered by the first surface member 18;

g) attaching the sign surface member 20 to the first surface member 18 with, for example, adhesive caulking, so that the advertising indicia thereon is presented for viewing on the exterior side of the dump truck; and h) if a border for the sign is desired, bolting or otherwise securing the border member 22 to the frame member 16 in a manner such that the periphery or perimeter 50 of the sign surface member 20 is covered by the border member 22. The sign structure could either be built off-site at, for example, a factory and then attached as a unit to the sidewall of a dump truck, or the disassembled parts of the sign could be assembled directly on to the dump truck sidewall and attached thereto in a step-by-step process.

When it is desired to change the sign, the border member 22, if on, is removed, and the sign surface member removed or scraped off and replaced with a new sign surface member with new advertising indicia thereon. Alternatively, the indicia could be directly painted onto a surface affixed to the frame.

When the advertising structure of the invention is attached to a dump truck, it is desirable to include in the mounting structure a sub-system which allows the sign surface to be moved vertically up and down with respect to the truck body and the ground (note direction arrows in FIG. 1). This allows any needed clearance to be made available.

Thus, when the dump truck 14 is being loaded, it may be desirable to lower the sign with respect to the truck bed so that the upper end or top of the sign is below the upper edge of the truck bed's sidewall, allowing, for example, bucket loaders to be more easily moved across over the dump truck bed at the usual height, rather than at a greater height due to the otherwise upwardly extending presence of the sign. Likewise, it may be desirable to raise the sign up with respect to the truck bed when the dump truck bed is going to be raised to dump its load, providing greater clearance between the ground and the bottom of the sign, allowing the dump bed to be moved up without otherwise causing the bottom of the sign to hit the ground.

As previously noted, it is desirable and a distinctive feature of the preferred embodiment of the invention to have the sign surface extend both substantially above and substantially below the dump truck sidewall, that is the height of the sign surface member is greater than the height of the sidewall, increasing the available display area of the sign, in spite of the relatively shallow height of the typical dump truck sidewall. Having the sign vertically movably mounted on a sub-system, which allows the sign to be raised up and down with respect to the truck bed, allows the use of such a relatively large sign surface without hampering the use and operation of the dump truck 14. Such a sub-system allows the sign's ground clearance to be changed, while also allowing the distance that the top of the sign surface extends above the top of the sidewall to be increased and decreased.

There are many such available sub-systems to those of ordinary skill in the art. As an example, a series of laterally spaced, vertical, at least partially telescoping, trucks could be used with, for example, an electric motor controlled from the truck cab to drive the sign surface mounted on one set of trucks up and down with respect to the other set of trucks, using gear wheels and teeth trucks or racks, until the desired vertical position (either up or down) was reached.

To enhance the advertising impact of the sign, either or both of the dynamic members, that is, the rotating, reciprocating wheel 46 or other moving member and/or the "smoking cigarette" 48 (or other smoking effect using the truck engine's exhaust) could be used (note smoke "S" in FIG. 1).

It is noted that, in referring to a "planar advertising system", the present invention refers primarily to a system having a relatively large, longitudinally extended, at least generally flat surface allowing the easy use of advertising display materials which are usually provided in the form of printed paper or plastic sheets with the advertising indicia printed thereon.

It is further noted that the embodiment described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle-mounted, advertising system, comprising:
 a moveable, drivable dump truck having a chassis upon which is mounted a pivotable, dump truck body having substantially non-planar sidewalls with a series of vertically disposed sidewall strengthening members with open space between them; and
 an advertising system having a backside mounted on at least one of said sidewalls extending longitudinally across at least three of said sidewall strengthening members creating at least two open areas behind the advertising system between said backside and the two sets of open spaces between said three strengthening members, said advertising system further including
 a rigid frame member defining an interior area enclosed by said frame member and said non-planar side wall, said frame member having means for attaching said frame member against said non-planar sidewall of said vehicle;
 a sign surface member carrier by said frame member covering over said interior area, said sign surface member having a perimeter within which advertising indicia is presented viewable on the exterior side of the sidewall to which said frame member is attached; and
 a border member carrier by said frame member and surrounding said sign surface member.

2. The vehicle-mounted, advertising system of claim 1, wherein:
 said rigid frame member is constructed from steel tubing having a cross-section defined by four sides.

3. The vehicle-mounted, advertising system of claim 2, wherein there is further included:
 a first surface member attached to said frame member extending over said interior area; said sign surface member being attached to said first surface member and substantially covering said first surface member; and wherein:
 said first surface member is constructed of metal sheeting.

4. The vehicle-mounted, advertising system of claim 3, wherein:
 said metal sheeting is galvanized.

5. The vehicle-mounted, advertising system of claim 1, wherein:
 said sign surface member is constructed of a plastic material.

6. The vehicle-mounted, advertising system of claim 1, wherein:
 said frame member includes a plurality of cross-members oriented in parallel relationship to one another.

7. The vehicle-mounted, advertising system of claim 1, further including:
 a motor, in mechanical connection with said frame member, having a rotatable shaft; and
 a first surface member attached to said frame member extending over said interior area; said sign surface member being attached to said first surface member and substantially covering said first surface member; and wherein:
 said first surface member has a first aperture through a portion thereof; and
 said sign surface member has a second aperture through a portion thereof in substantial alignment with said first aperture, said first and second apertures having disposed therethrough said rotatable shaft of said motor.

8. The vehicle-mounted, advertising system of claim 7, wherein:

said motor is located in one of said open areas.

9. The vehicle-mounted, advertising system of claim 7, wherein there is further included:

a dynamic, moveable member located on the exterior of said sign surface member and connected to said motor and being driven by said motor causing movement of said dynamic member with respect to said sign surface.

10. The vehicle-mounted, advertising system of claim 9, wherein:

said sign surface member is movably mounted on said sidewall allowing its position relative to said sidewall to be moved up and down.

11. The vehicle-mounted, advertising system of claim 10, wherein:

said sign surface member has a top and a bottom with a height greater than the height of said sidewall, allowing said surface member to extend above and below said side wall, said surface member's moveable mounting allowing it to be moved up and down to adjust its effective ground clearance between its bottom and the ground and to increase and decrease the distance its top extends above said sidewall.

12. The vehicle-mounted, advertising system of claim 1, wherein said dump truck has an engine exhaust system, and wherein there is further included:

a piping subsystem, including an elongated member mounted on said dump truck and having a first and second end, said first end being connected to said engine exhaust system of said dump truck and said second end being associated with said sign surface and being located substantially above said first end, the exhaust from the dump truck engine being exhausted out of said second end, creating a smoking effect.

13. The vehicle-mounted, advertising system of claim 12, wherein:

said elongated member and said sign surface member create the appearance of a cigarette.

14. The vehicle-mounted, advertising system of claim 12, wherein said dump truck has a cab, and wherein there is further included:

a control subsystem associated with said piping subsystem, a part of said control subsystem being located in said cab, allowing the driver of the dump truck to open and close said piping subsystem.

15. A method of outdoor, vehicular sign advertising, comprising the steps of:

a) using a dump truck having a dump truck bed with non-planar sidewalls due comprised of sidewall panel surfaces of relatively small areas spaced apart by a series of laterally spaced, vertically extending, structural strengthening members which extend a significant distance exteriorly out from the panel surfaces, with the sidewalls each having a bottom edge and a top edge;

b) attaching a relatively planar sign support surface on at least one of said sidewalls with the support surface bridging laterally across at least three of said strengthening members and extending past at least one of said sidewall edges and up to at least about the other of said sidewall edges, providing a sign display surface greater than at least two of said panel surfaces; and c) providing advertising or information indicia on said sign support surface.

16. The outdoor, vehicular sign advertising method of claim 15, further comprising the following steps:

providing a moveable sub-system between said sign support surface and the sidewall which allows said sign support system to be moved up and down with respect to the dump truck bed; and raising said sign support surface up with respect to said truck bed before raising said dump truck bed to dump any load it may have in it, increasing the effective ground clearance distance between the bottom of the sign support surface and the ground.

17. The outdoor, vehicular sign advertising method of claim 16, further comprising the following steps:

lowering said sign support surface down with respect to said truck bed right before or during the dump loading operation when using a swinging dump bucket moving over the sidewall.

18. The outdoor, vehicular sign advertising method of claim 15, further comprising the following steps:

locating a drive motor underneath said sign support surface and between two of said structural strengthening members, effectively enclosing the motor between said support surface and said members.

19. The outdoor, vehicular sign advertising method of claim 18, further comprising the following steps:

providing a dynamic attention getting device on the exterior surface of said sign support surface and driving its movements with said motor to increase the attention getting characteristics of the sign.

20. The outdoor, vehicular sign advertising method of claim 15, further comprising the following steps:

providing a dynamic attention getting device on the exterior surface of said sign support surface and connecting it to the exhaust system of the truck and using the smoke from the exhaust system in connection with said device to increase the attention getting characteristics of the sign.

21. A method of outdoor, vehicular sign advertising, comprising the steps of:

attaching a relatively large sign structure to a dump truck with non-planar sidewalls, each of which sidewalls is formed by at least three, vertically disposed, longitudinally spaced, relatively thick, structural strengthening members with a relatively thin, interiorly disposed, side wall surface between them, further including the following steps a) providing a rigid frame member defining an interior area enclosed by said frame member and said non-planar side walls of a width greater than the spacing of the three, sidewall, structural strengthening members, b) providing a first surface member attachable to said frame member in a manner such that said interior area is substantially covered across by said first surface member;

c) providing a sign surface member carrying advertising indicia attachable to said first surface member in a manner such that said sign surface member substantially covers said first surface member, said sign surface member having a perimeter;

d) providing a border member;

e) attaching said frame member to and against the non-planar sidewall of the dump truck with said frame member extending across at least three of the sidewall, structural strengthening members;

f) attaching said first surface member to said frame member in a manner such that said interior area is substantially covered by said first surface member;

g) attaching said sign surface member to said first surface member; and h) attaching said border member in mechanical connection with said frame member in a manner such that said perimeter of said sign surface member is covered by said border member.

22. The method of outdoor vehicular sign advertising of claim 21, further comprising the step of:

providing a moveable sub-system between said sign structure and the sidewall, allowing the sign structure to be moved up and down with respect to the dump truck.

23. The method of outdoor vehicular sign advertising of claim 22, further comprising the step of:

raising the sign structure to increase the effective ground clearance distance between the bottom of the sign structure and the ground.

24. The method of outdoor vehicular sign advertising of claim 22, further comprising the step of:

lowering the sign structure to increase the effective clearance distance between the top of the sign structure and the top of the dump truck sidewall.

25. The method of outdoor vehicular sign advertising of claim 21, further comprising the step of:

installing a drive motor between the sign structure, the sidewall, and two of the structural strengthening members, thereby enclosing the motor.

26. The method of outdoor vehicular sign advertising of claim 25, further comprising the step of:

providing a dynamic attention getting device on the exterior surface of said sign structure and driving its movements with said motor.

* * * * *